United States Patent [19]
Jehle

[11] 3,715,720
[45] Feb. 6, 1973

[54] APPARATUS FOR DETERMINING AN UNDERINFLATED CONDITION IN PNEUMATIC TIRES

[76] Inventor: Frederick S. Jehle, 517 East 25th, Hutchinson, Kans. 67501

[22] Filed: Feb. 25, 1971

[21] Appl. No.: 118,825

[52] U.S. Cl. ................................. 340/58, 340/272
[51] Int. Cl. ..................... B60c 23/00, G08b 13/10
[58] Field of Search ....... 340/58, 272; 73/1 B, 146.2, 73/146.3; 200/61.22, 61.26, 85

[56] References Cited

UNITED STATES PATENTS

| | | | |
|---|---|---|---|
| 2,313,156 | 3/1943 | Kratt, Jr. | 340/58 UX |
| 2,663,009 | 12/1953 | Finan | 340/58 |
| 3,478,582 | 11/1969 | Hough | 73/146.2 |

Primary Examiner—Donald J. Yusko
Attorney—Gregory J. Nelson

[57] ABSTRACT

A device for detecting a flat or underinflated condition in a pneumatic vehicle tire as the tire traverses the device. The rod end of a ram serves as a probe mounted in the path of the vehicle tire and is biased into engagement with the tire by a predetermined force maintained in the ram through a regulated pressure circuit. A tire having adequate air pressure will exert sufficient downward force to overcome the biasing force and cause the rod to depress. An associated signal circuit is controlled by limit switches actuated by rod movement. Depression of the rod permits the switched circuit to remain inactive. Failure of the rod to depress the tire as it passes across the rod causes the circuit to actuate an appropriate signal.

5 Claims, 5 Drawing Figures

INVENTOR
FREDERICK S. JEHLE
*Gregory J. Nelson*
ATTORNEY

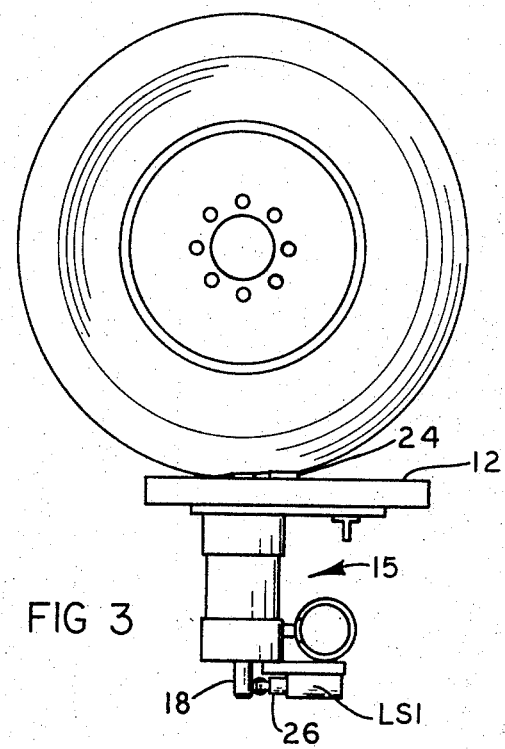
FIG 3
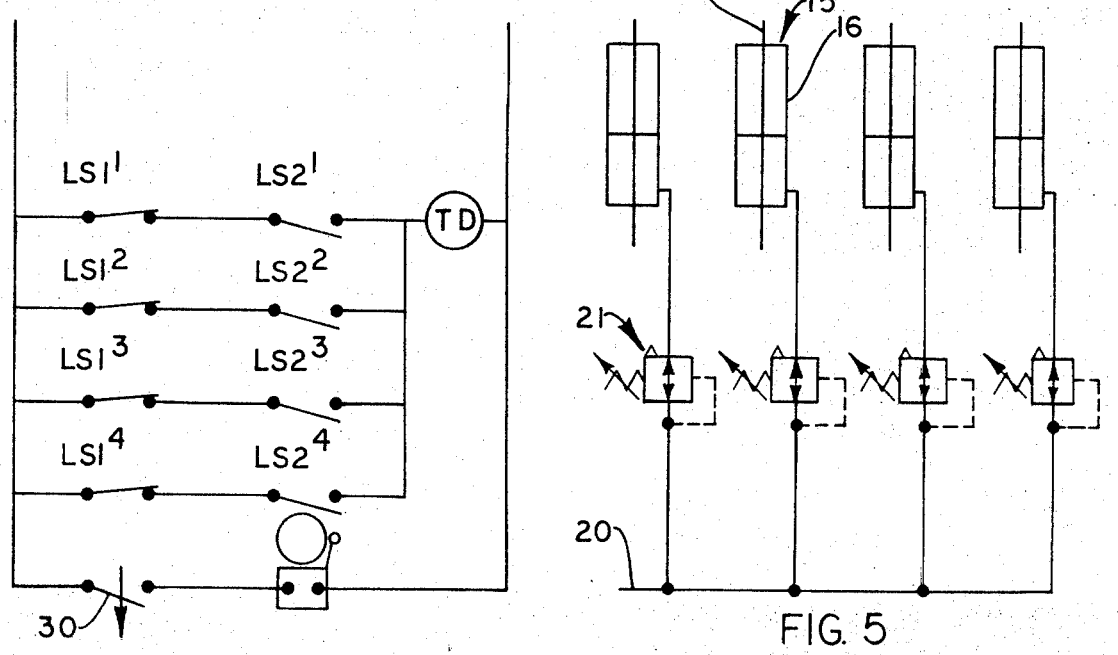
FIG 4
FIG. 5
INVENTOR
FREDERICK S. JEHLE
ATTORNEY

APPARATUS FOR DETERMINING AN UNDERINFLATED CONDITION IN PNEUMATIC TIRES

BACKGROUND OF THE INVENTION

The present invention pertains to a device for detecting a flat or a low pressure condition in pneumatic tires for vehicles. An underinflated pneumatic vehicle tire, especially in tandem dual arrangements for heavy truck-trailer combinations often goes undetected and poses a serious safety threat. Further, the tread of a low or underinflated tire will not fully contact the road and wear of the reduced area of contact is accelerated. Handling of the vehicle is rendered more difficult and unsafe. Heretofore, it has been the practice for the driver or operator of such a vehicle to periodically check for flat or low pressure tires by checking the tire with a gauge or relying upon a visual inspection or manually by striking the tires with a tire iron or similar object.

It is also known in the prior art to provide devices which detect a low tire pressure condition. For example, there are apparatus upon which a truck or similar tire can be driven and which, electrically or hydraulically, measure the pressure exerted by the tire transversely along the cross-section of the tread. Similar pressure indicates that the full tread is contacting the roadway and hence the tire is properly inflated. Also, it is known to check aircraft tires by simply monitoring the resistance of a tire to deflection by a feeler device disposed in a wheel well. Such devices are either not adaptable to vehicles or are complex and require multiple sensors for each tire and accordingly have not found wide acceptace.

SUMMARY OF THE INVENTION

With the foregoing in mind, it is a principal object of this invention to provide a device that will automatically detect a deflated or flat condition in a pneumatic tire automatically as the vehicle is driven or rolled across the device and a resulting visible or audible signal is given should there be such a condition. The device may be so constructed that it accommodates tandem dual tires arrangement associated with heavy tractor-trailers. The device of the present is particularly simple and reliable and may be installed in such places as truck service centers, service stations, truck stops and the like.

Briefly, my invention, in the preferred embodiment, consists of a probe in the form of a pneumatic or hydraulic double ended cylinder arranged with one rod end vertically projecting a short distance above roadway elevation and aligned in the path of vehicle travel. The opposite rod end of the cylinder is positioned to open a precision limit switch when the piston is depressed extending the lower rod. A second limit switch, having normally open contacts and serving as an interlock to insure operation only when a tire traverses the detector device, is arranged to be depressed by the tire simultaneously with engagement between the tire and probe rod. The limit switches, as described in greater detail hereafter, are electrically connected into a relay circuit including an appropriate warning or signal device. As the vehicle rolls across the device contacting the piston rod, a tire having an adequate air supply or degree of inflation will cause the rod and piston to depress, thus opening the first limit switch while closing the second, leaving the circuit to the warning device open. A deflated tire will have insufficient pressure to depress the piston rod and will leave the limit switch associated with the piston closed but will cause the second switch to close thus completing the circuit giving a warning signal.

The invention then contemplates an improved low pressure detector for pneumatic tires that may readily be installed in any temporary or permanent location.

The invention also has as an object the provision of a device for physically checking pneumatic tires for an adequate degree of inflation through the expedient of a tire engaging probe which causes actuation in an associated electrical circuit case of insufficient tire pressure.

Another more specific object of my invention is the provision of a fluid actuated ram with an extending rod that engages the tire and controls the actuation of a warning signal in an associated electrical circuit if a low pressure condition exists.

Another object of my invention is to overcome the disadvantages of the prior art devices and provide a novel device for checking vehicle tires while in transit over the device. The device is designed so that it may be permanently installed in a truck service center or portable and may be set as a temporary vehicle safety check station by motor vehicle inspectors.

The invention generally contemplates an improved, simple and economical device for automatically testing the inflation of tires on moving vehicles.

To the accomplishment of the foregoing and related ends, the invention comprises the features hereinafter described and particularly pointed out in the claims. The following description and annexed drawings set forth in detail a certain illustrative embodiment of the invention, this being indicative, however, of but one of the various ways in which the principle of the invention may be employed.

BRIEF DESCRIPTION OF THE DRAWINGS

In the annexed drawings:

FIG. 3 is a partial view of the detector shown in FIG. 2 and further showing a tire positioned thereon;

FIG. 4 is a schematic of the electrical system of the device; and

FIG. 5 is a schematic of the pneumatic system incorporated in my device.

DESCRIPTION OF THE PREFERRED EMBODIMENT

Figure 2:
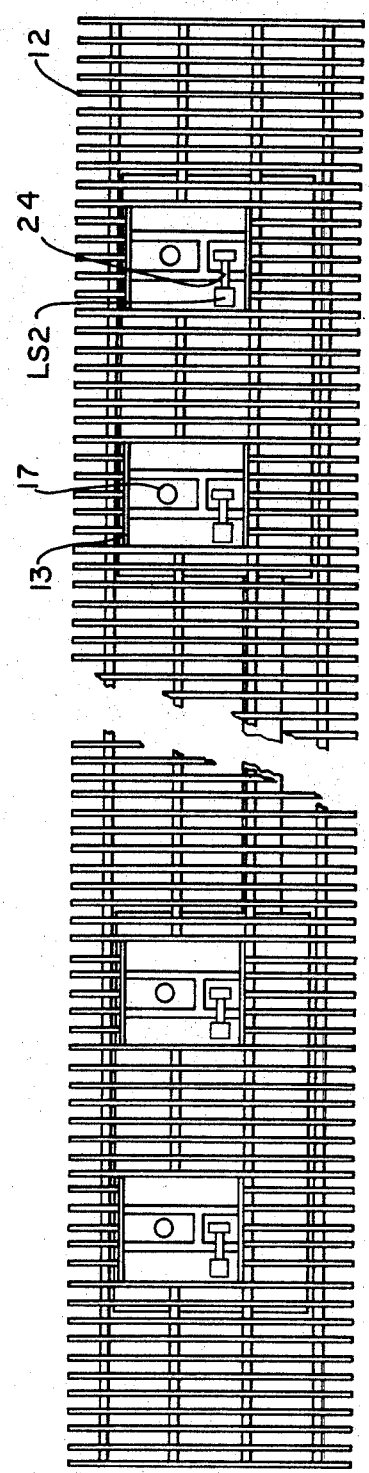
FIG. 2 is a top plan view of the detector of FIG. 1.

Referring now in detail to the drawings, the device is generally indicated at 10 and is shown as being installed in a receiving trench in a roadway. For example, such an installation may be made at a truck service center to quickly accommodate and check vehicles in transit with a minimum of delay. Although the installation is shown as being permanently embedded in concrete, the unit could as easily be made portable simply by making it a part of a transportable roadway ramp upon which vehicles could drive as part of a vehicle inspection. A mounting assembly includes horizontal beam members 11 upon which is supported a platform 12 shown as standard heavy duty grating or expanded metal. Platform 12 could also be in the form of heavy steel plate to completely seal the components from dirt and foreign objects. The upper edge of grating 12 corresponds approximately to the elevation of the adjacent roadway. As best seen in FIG. 2, platform 12 is provided with a number of generally rectangular openings 13 longitudinally spaced apart. These openings 13 accommodate the detector units 15. The spacing of the detector units may be varied depending on the installation and type of service, the spacing shown with two adjacent units near either end of the unit being typical of that used to accommodate dual tandem truck trailers.

Figure 1:
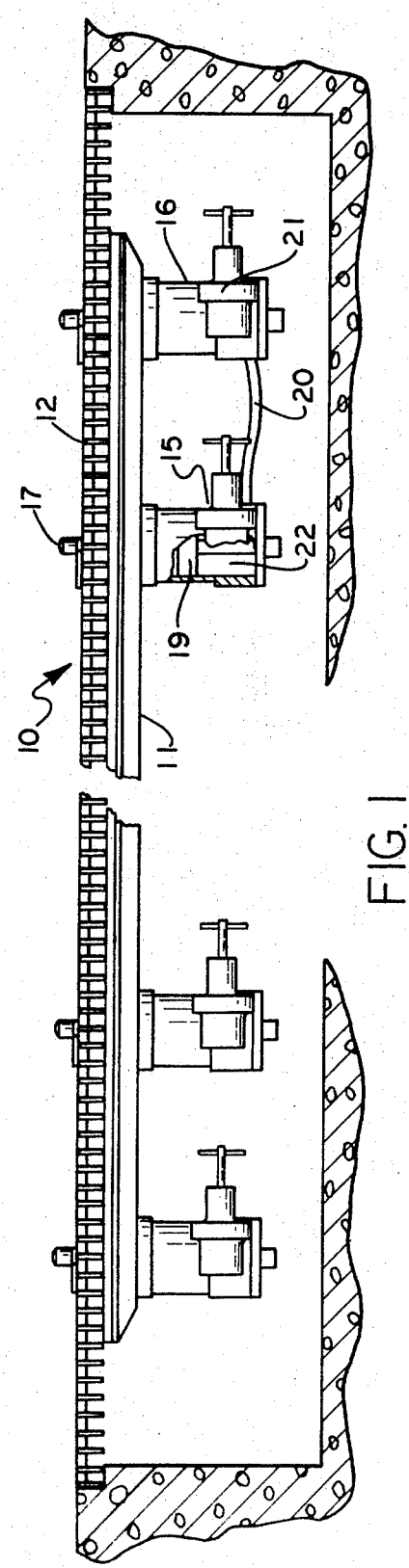
FIG. 1 is a side elevational view of the detector of the present invention, the same being shown in an assembled position in an installation trench.

Each of the detector units 15 comprises a probe unit in the form of a hydraulic or pneumatic actuator or ram 16 vertically positioned on the underside of platform 12. The actuator 16 includes an upper rod 17 and lower rod 18 extending oppositely from the piston 19 reciprocable within the housing. The actuator is positioned so that the upper rod 17 in an extended position projects vertically several inches above the plane of the platform to serve as a probe or indentor as shown in FIG. 1. The opposite, lower rod end 18 serves to actuate microswitch LS1 as will be more fully explained later. Throughout this description reference will be made to a single actuator unit, it being understood that such description is typical for each of the four shown and therefore only one need be described. Each actuator has its lower chamber 22 connected to a source of fluid or air pressure 20 which is regulated by pressure regulator 21 to maintain a predetermined working pressure in the lower working chamber 22 of the cylinder to exert a predetermined upward biasing force on probe 17. In addition, a pressure relief valve is included in the pneumatic system to relieve pressure from the working chamber when the pressure rises beyond a predetermined level. The pneumatic components can be seen schematically represented in FIG. 4 and are conventional and are available commercially. It should be noted that although for convenience and ease of regulation, I have shown a cylinder 16 as part of the probe unit, any suitable means, such as a spring loaded device, would be adaptable into the system and could be used to bias the probe into an extended position.

It will be obvious that the degree or amount of force exerted by the tire against the probe is directly proportional to the degree of inflation of the tire and that an underinflated or flat tire will exert less force upon the probe to overcome the upward bias thereagainst.

A switch LS2 is mounted on platform 12 adjacent the probe having actuating arm 24 in the part of the tire travel so that arm 24 is simultaneously engaged by the tire along with probe 16. Limit switch LS2 has normally open contacts which will be closed by the force exerted by any tire engaging arm 24. As seen in FIG. 4, LS2 functions as an interlock insuring the circuit is only operative when a tire engages the probe unit.

Mounted on the lower end of cylinder 16 is another limit switch LS1, having actuating arm 26 arranged so as to be engaged by lower rod 18 upon downward movement of piston 14. Upon engagement of arm 26 to the end of rod 18, the contacts of LS1 are caused to open from their normally closed position. The arrangement of LS1 in the electrical system may be seen in detail in FIG. 4 as well as the arrangement of LS2. In FIG. 4 the respective switches house each of the four vehicle wheels per axle are designated by respective prime numbers.

Further, referring to FIG. 4, the circuit is completed by a pulse generating or delay in opening device TD having associated contacts 30. A signal or warning device, shown as a bell 31, completes the circuit and when actuated gives an appropriate signal. It will be obvious that if the circuit included only single switch LS1, a signal would be continuously given except when a sufficiently inflated tire depressed the probe opening LS1. LS2 serves as an interlock insuring actuation of the signal device only when a tire is driven across the device.

Also obvious modifications can be made to this circuit to accomplish the desired result. For example, it may be desirable to provide a separate relay and signal device circuit for each probe unit so that it will immediately be obvious at which wheel a low pressure condition exists.

OPERATION

In operation the device 10 of the present invention is preferably installed as mentioned above with the top grating 12 at ground elevation for convenient access to permit trucks or vehicles to drive across.

The vehicle to be checked is driven across grate 12 with its wheels in proper alignment with the probe rods 17 actuated and extending a short distance above the grate 12. The system is properly activated with air being applied to cylinder 16 at a predetermined pressure and current supplied to the electrical circuit. In this condition, the electrical circuit is as shown in FIG. 4 with LS1 switches being closed and LS2 switches being open. The pressure level maintained in the cylinder is dependent on such variables as cylinder size and type of tire to be tested. For example, using a standard 4 inch diameter cylinder, air pressure of 65 psi to the cylinder was used to check truck tires normally inflated to 90 psi.

Assuming that all of the vehicle tires are adequately inflated, the following will happen: a tire will roll onto the probe rod 17 and overcome the predetermined working pressure against the rod forcing the rod to downwardly retract; the lower rod 18 will, after approximately one inch linear travel, engage the arm 26 of lower limit switch LS1 causing the circuit of LS1 to open; as the tire rolls ahead a few inches further, as is best seen in FIG. 3, the actuator arm 24 of LS2 is engaged and LS2 is caused to close; however, since LS1 is open no current is supplied to TD and accordingly no signal is given and the tire is assumed safe.

Assuming, however, should one of the tires have less than a safe level of inflation as it encounters probe rod 17, it will not be able to overcome the working pressure existing in lower cylinder chamber 22. Therefore, LS1 will not be caused to open leaving the switch in a closed condition. Again as the tire travels slightly ahead, LS2 will be actuated through arm 26 and caused to close, thus completing the circuit to TD closing contacts 30. A proper low pressure signal will be given by way of a light bell, horn or other signal device. The signal continues until delay device TD is released and the circuit resets and is again ready for operation.

The foregoing description is the preferred embodiment of my vehicle tire pressure detecting arrangement. The operation of my device relies upon tire pressure to exert a force which is monitored and gives a proper signal. It will be readily apparent that other means, different from the biased probe, can be used to detect the force exerted by the tire. For example, strain gauges of the load cell type, well known, could measure the actual pressure exerted by the tire at the point of contact and render an electric signal proportional thereto which could be used to operate switch LS1.

Thus, it can be seen that I have invented an efficient, novel device for quickly checking the tires of a moving vehicle. While I have illustrated and described several embodiments of the invention, it will be understood that these are by way of illustration only, and that various changes and modifications may be made within the contemplation of the invention.

Having clearly described the invention and thereby enabling those skilled in the art to construct and use its principles, I claim:

1. A device for determining an underinflated condition in a pneumatic tire as the vehicle mounted tire passes across the device, said device comprising:
   platform means defining a vehicle roadway;
   means located in the roadway having probe means associated therewith, said probe means adapted to engage a vehicle tire, said probe being biased to a first position by a force of predetermined magnitude related to the desired test pressure and being movable to a second position against said bias by the force exerted by a tire of predetermined inflation;
   circuit means responsive to and actuated by said probe means, said circuit means remaining unactuated in response to said probe means assuming said second position and being responsive to said first position of said probe to render a signal indicating an underinflated condition whereby the inflation of a vehicle tire can be checked as the vehicle tire passes across said probe.

2. A device for determining an underinflated condition in a pneumatic tire as the vehicle mounted tire passes across the device, said device comprising:
   platform means defining a vehicle roadway;
   an actuator associated with said platform and having a movable piston therein defining opposite pressure chambers and a piston rod extending therefrom, said piston rod extending above said platform to engage the vehicle tire as it travels across the platform;
   said piston and rod being biased by a predetermined force exerted by working pressure in the actuator to a first position and being movable by a predetermined force exerted by said tire to a second position; and
   circuit means including and signal means responsive to the position of said piston whereby said signal remains unactuated when said piston and rod are in said first position and upon said piston and rod being moved to said second position is engaged to render a signal indicating an underinflated condition.

3. A device for determining an underinflated condition in a pneumatic tire as the vehicle mounted tire is driven across the device, said device comprising:
   platform means defining a vehicle roadway;
   an actuator associated with said platform having a movable piston therein with an extending piston rod, said rod having a first position extending above said platform;
   a regulated supply of pressure connected to said actuator urging said rod to said first position and said rod being movable by a predetermined force exerted by said tire having an adequate inflation condition to a second position;
   circuit means associated with said actuator, said circuit means including a signal means and first switch means having a first closed and second open position, said switch movable to said first position when said actuator rod is moved to a second position in response to inadequately inflated tire;
   second switch means having a first closed and second open position and mounted to be actuated to said second closed position as a tire engages said rod, said signal means being actuated only when said first and second switch means assume their first positions causing said signal to be activated thereby indicating an underinflated condition.

4. The device of claim 3 wherein said actuator is a pneumatic ram and said first switch is a limit switch positionable by movement of said rod and having a normally closed first position and an open second position and said second switch is a limit switch having actuating means located in said tire path and having a normally open first position and a closed second position.

5. The device of claim 3 wherein a plurality of actuator units are provided corresponding to the number of vehicle wheels per axle on the vehicle driven across the device and said circuit means is adapted to indicate at which wheel the low pressure condition exists.

* * * * *